(12) United States Patent
Mooney

(10) Patent No.: US 10,828,997 B2
(45) Date of Patent: Nov. 10, 2020

(54) ELECTRIC VEHICLE ONBOARD RECHARGING SYSTEM

(71) Applicant: James Richard Mooney, Flushing, NY (US)

(72) Inventor: James Richard Mooney, Flushing, NY (US)

(*) Notice: Subject to any disclaimer, the term of this patent is extended or adjusted under 35 U.S.C. 154(b) by 159 days.

(21) Appl. No.: 15/705,649

(22) Filed: Sep. 15, 2017

(65) Prior Publication Data

US 2019/0023137 A1  Jan. 24, 2019

Related U.S. Application Data

(63) Continuation of application No. 15/656,113, filed on Jul. 21, 2017, now abandoned.

(51) Int. Cl.
| | | |
|---|---|---|
| *B60L 53/18* | (2019.01) | |
| *B60L 11/18* | (2006.01) | |
| *B60L 50/90* | (2019.01) | |
| *B60L 50/62* | (2019.01) | |
| *B60L 53/302* | (2019.01) | |
| *B60L 53/50* | (2019.01) | |

(52) U.S. Cl.
CPC ........... *B60L 53/18* (2019.02); *B60L 11/1816* (2013.01); *B60L 50/62* (2019.02); *B60L 50/90* (2019.02); *B60L 53/302* (2019.02); *B60L 53/50* (2019.02); *B60L 2240/36* (2013.01); *Y10S 903/906* (2013.01)

(58) Field of Classification Search
CPC ....................................................... B60L 1/10
USPC ........................................... 320/104; 307/23
See application file for complete search history.

(56) References Cited

U.S. PATENT DOCUMENTS

| | | | | |
|---|---|---|---|---|
| 7,151,326 | B2* | 12/2006 | Jordan | B60L 1/003 |
| | | | | 307/22 |
| 8,330,412 | B2* | 12/2012 | Lattin | G01R 31/3842 |
| | | | | 320/104 |
| 9,586,458 | B2* | 3/2017 | Larson | B60H 1/00014 |
| 10,319,207 | B1* | 6/2019 | Janscha | G08B 17/117 |
| 2012/0296567 | A1* | 11/2012 | Breed | G01C 21/26 |
| | | | | 701/468 |
| 2013/0069426 | A1* | 3/2013 | Nien | B60L 50/66 |
| | | | | 307/10.1 |
| 2014/0009113 | A1* | 1/2014 | Robins | B60K 6/46 |
| | | | | 320/109 |

(Continued)

FOREIGN PATENT DOCUMENTS

WO  WO2016/053786 A1 * 9/2015 .............. H02J 7/34

OTHER PUBLICATIONS

Gadget review , "How to charge BMW's i3 electric car in a desert (or any where)—Gadget review", Youtube (Year: 2014).*

*Primary Examiner* — Edward Tso
*Assistant Examiner* — Ahmed H Omar
(74) *Attorney, Agent, or Firm* — The Farrell Law Firm, P.C.

(57) ABSTRACT

Disclosed is an onboard recharging system that recharges an electric vehicle battery when the vehicle is being driven in full operation or at rest. The recharging system includes a generator configured to be installed in the vehicle, a fuel tank configured to supply fuel to the generator, a charging port configured to receive a charge from the generator, and a charge input configured to receive the charge from the charging port and to supply the charge to a battery that powers an engine of the vehicle.

15 Claims, 9 Drawing Sheets

(56) References Cited

U.S. PATENT DOCUMENTS

| | | | |
|---|---|---|---|
| 2014/0168433 A1* | 6/2014 | Frank | H04N 5/33 |
| | | | 348/143 |
| 2015/0054460 A1* | 2/2015 | Epstein | B60L 11/187 |
| | | | 320/109 |
| 2016/0212885 A1* | 7/2016 | Ikeda | B60K 6/48 |
| 2016/0272073 A1* | 9/2016 | Hosaka | H05K 7/1432 |

* cited by examiner

ELECTRIC VEHICLE ONBOARD RECHARGING SYSTEM

PRIORITY

This application is a Continuation Application of U.S. patent application Ser. No. 15/656,113, which was filed in the U.S. Patent and Trademark Office on Jul. 21, 2017, the contents of which are incorporated herein by reference.

BACKGROUND

1. Field of the Invention

The present invention relates generally to a recharging system, and more particularly, to an onboard recharging system mounted in an electric vehicle and method for recharging a battery that powers an engine of an electric vehicle when the vehicle is in full operating motion or at rest.

2. Description of the Related Art

Recently, the electric vehicle has increased in popularity, mainly due to the substantial increase in miles traveled on a single charge, as compared to miles per gallon generally achieved on a single tank of gasoline, in the case of gasoline-powered vehicles. This trend is likely to continue, at least in view of recent government mandates on vehicle manufacturers for higher vehicle efficiency.

As an example, the recently-introduced Chevrolet Bolt® EV (hereinafter, Bolt) is an electric vehicle that includes a 960-pound, 60 kilowatt-hour (60 kWh) lithium-ion floor-mounted battery which powers a 200 horsepower (200-hp) electric motor that has been tested as achieving a 75 mile per hour (75-mph) highway range of 190 miles, and estimated by the Environmental Protection Agency (EPA) as being capable of achieving a 238 mile range at cruising speed.

Much like the other electric vehicles on the market, the Bolt battery is recharged via an onboard charger that, when connected to a 110 Volt (110V) standard wall outlet (Level 1) or a 220-240 Volt (220-240V) custom home or public charging station (Level 2) supplies a charge to the battery and adds miles of range to the electric vehicle.

However, the conventional charging unit suffers from the inability to recharge the battery while the electric vehicle is in motion, which is an inconvenience to the user of the electric vehicle and has caused a "range anxiety" that has restricted electric vehicle popularity.

In addition, charging stations for electric vehicles are far less prevalent in comparison to gasoline stations for gasoline-powered vehicles, which is a further inconvenience to the electric vehicle user.

Moreover, although electric vehicles are generally more efficient than gasoline powered vehicles, electric vehicles tend to have a substantially lower mileage range between charges, compared to the mileage range between fueling for the typical gasoline powered vehicle, which is another inconvenience to the user of the electric vehicle.

As such, there is a need in the art for an onboard recharging system for an electric vehicle that increases the mileage range and flexibility of the battery recharge.

SUMMARY

The present invention has been made to address at least the above-mentioned problems and/or disadvantages and to provide at least the advantages described below.

Accordingly, an aspect of the present invention is to provide an onboard recharging system for an electric vehicle, which enables a user to recharge the battery of the electric vehicle while the vehicle is being operated any time or any place.

Another aspect of the present invention is to provide a recharging system for an electric vehicle, which significantly increases the range that the battery can achieve on a single charge, as compared to the conventional recharging for electric vehicles.

Another aspect of the present invention is to provide a recharging system for an electric vehicle, which eliminates the need to "plug-in" charge the electric vehicle at a charging station or a 110V or 220V outlet and receive the charge via the power grid.

According to an aspect of the present invention, a recharging system for a vehicle includes a generator configured to be installed in the vehicle, a fuel tank configured to supply fuel to the generator, a charging port configured to receive a charge from the generator, and a charge input configured to receive the charge from the charging port and to supply the charge to a battery that powers an engine of the vehicle.

According to another aspect of the present invention, a method of recharging a battery powering an engine in a vehicle includes operating a generator that is installed in the vehicle, receiving a charge from the generator, and supplying the charge to the battery that powers the engine.

According to another aspect of the present invention, a recharging system for a vehicle includes a generator configured to be installed in the vehicle, a fuel tank configured to supply fuel to the generator, and a charge input configured to receive the charge from the generator through a charge cable, and to supply the charge to a battery that powers an engine of the vehicle.

According to another aspect of the present invention, a method of recharging a battery powering an engine in a vehicle includes activating and supplying fuel to a generator that is installed in the vehicle, receiving, at an input, a charge directly from the generator through a charge cable, and supplying, by the input, the charge to the battery that powers the engine, while the vehicle is being operated.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
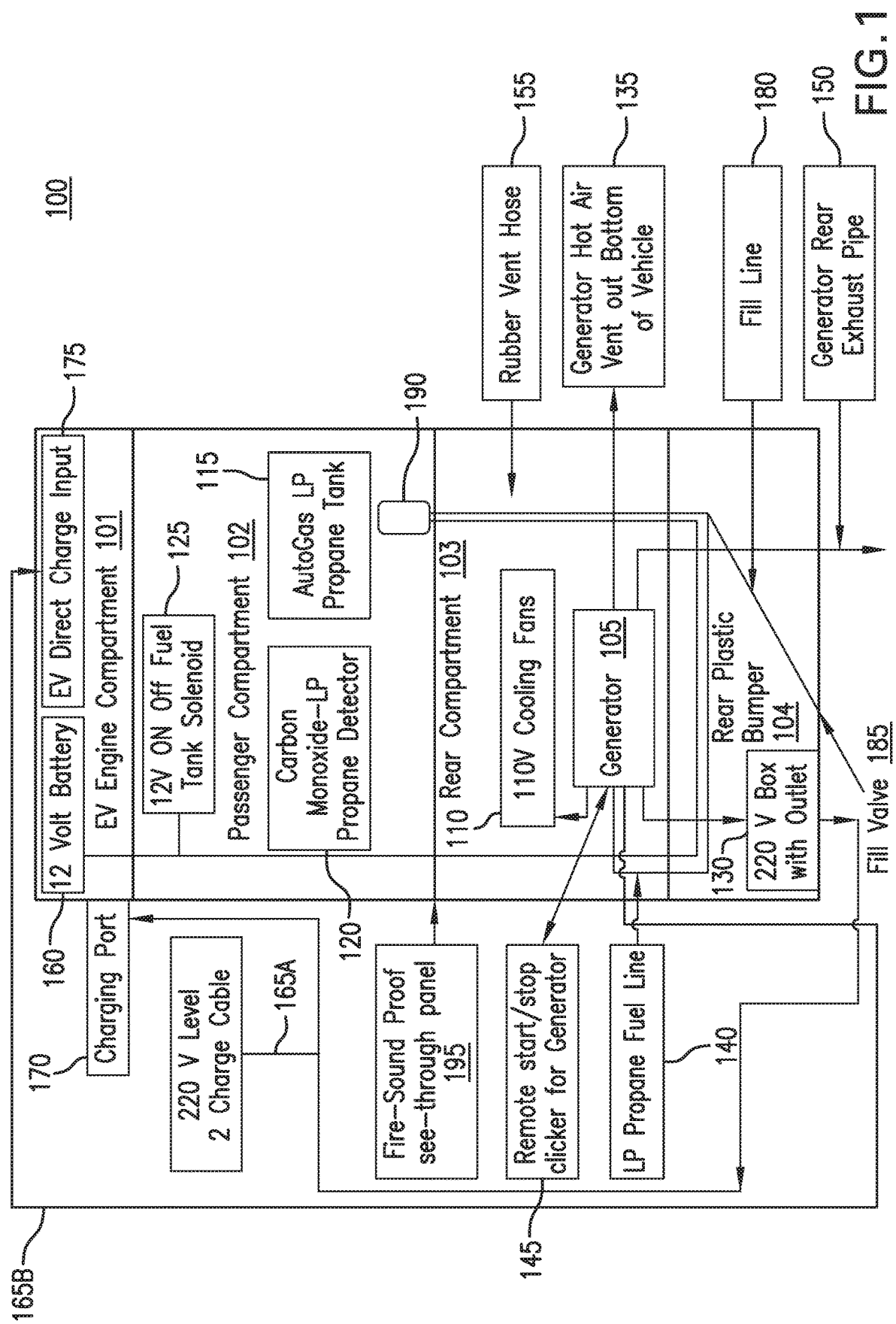
FIG. 1 illustrates a schematic diagram of the recharging system according to the present invention.

Embodiments of the present invention will be described herein below with reference to the accompanying drawings. However, the embodiments of the present invention are not limited to the specific embodiments and should be construed as including all modifications, changes, equivalent devices and methods, and/or alternative embodiments of the present invention. Descriptions of well-known functions and/or configurations will be omitted for the sake of clarity and conciseness.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustrative purposes only and not for the purpose of limiting the present invention as defined by the appended claims and their equivalents.

Singular terms "a," "an," and "the" include plural references unless the context clearly dictates otherwise. For example, reference to "a component surface" includes reference to one or more of such surfaces.

The embodiments are described herein by way of illustration only and should not be construed in any way to limit the scope of the present invention. Those skilled in the art will understand that the principles of the present invention may be implemented in any suitably arranged electronic device.

As used herein, the term "substantially" indicates that the recited characteristic, parameter, or value need not be achieved exactly, but that variations such as tolerances, measurement errors, measurement accuracy limitations and other factors known to those of ordinary skill in the art, may occur in amounts that do not preclude the effect the characteristic was intended to provide.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present invention.

FIG. 1 illustrates a schematic diagram of the recharging system, according to the present invention.

Referring to FIG. 1, the recharging system 100 includes a generator 105 and a generator cooling apparatus 110 adapted for installation in a rear compartment 103 of the electric vehicle, a generator fuel tank 115, a fuel detector 120, and a fuel tank solenoid 125 adapted for installation in a passenger compartment 102 of the electric vehicle or underneath the vehicle, and a 220V-240V charging box 130 adapted for installation in the rear bumper area 104 of the electric vehicle.

The generator 105 may be a 220V Whisper Inverter Dual Fuel Gasoline or Liquid Propane (LP) generator which meets required safety and noise-sound levels for consumer use, may be any other similar generator on the market and known to those skilled in the art, and may be up to 240V in terms of power. The generator 105 provides the charge to the electric vehicle through the charging box 130, and is connected to a hot air vent 135 that releases hot air beneath the electric vehicle, a fuel line 140 that supplies fuel to the generator 105 from the generator fuel tank 115, a remote start/stop switch 145 that enables the generator 105 to be remotely activated or deactivated, and a rear exhaust pipe 150 that exhausts carbon monoxide gases from operation of the generator 105 to outside of the electric vehicle.

It is generally known that LP supplied in the USA has about 70% lower emissions than gasoline. As the generator 105 is a dual fuel gasoline or LP generator, however, either propane or gasoline may be used for generator powering purposes.

The generator cooling apparatus 110 is at least one 110V cooling fan that receives power from the 110V outlet of the generator 105, but may be any of cooling apparatuses that are well known to those skilled in the art and that have sufficient structural integrity and cooling speed or capacity for this application. The generator cooling apparatus 110 is positioned in close proximity to the generator 105, such as directly above the generator 105 as illustrated in FIG. 1, and ensures that the generator 105 operates at or below recommended temperature and does not overheat. The generator cooling apparatus 110 also circulates the ambient air in the rear compartment 103, for additional cooling purposes.

The generator fuel tank 115 may be a 25-gallon American Society of Mechanical Engineers (ASME) Auto Gas LP tank, but may be another of the well-known types of propane tanks and may vary in capacity. Alternatively, a gasoline tank may be used in place of the propane tank. The fuel line 140 is the conduit through which the generator fuel tank 115 supplies fuel to the generator 105, and is a hose constructed of rubber or any other suitable material. A 3-inch wide rubber vent hose 155 also extends between the fuel tank 115 and the rear bumper area 104 to vent fumes to the outside and to cover other lines and/or wiring, as will be described below in more detail. The width and material of the vent hose 155 may vary.

The fuel detector 120 may be both a carbon monoxide and an LP fuel detector, and is positioned adjacent to the generator fuel tank 115 for safety purposes, in order to detect any carbon monoxide or fuel leakage emanating from the generator fuel tank 115 in the passenger compartment 102. When a gasoline tank is used in place of the propane tank, the fuel detector may be substituted by a gasoline fuel detector. The fuel detector 120 may plug into an inverter that plugs into a 12V power outlet that comes standard with the electric vehicle.

The fuel tank solenoid 125 is electrically connected to the fuel tank 115, a 12V on/off switch and a 12V battery 160 that is installed as standard equipment in the engine compartment 101 of the electric vehicle. Specifically, the 12V positive and negative wires connect the fuel tank solenoid 125 to the on/off switch which is connected with an inline 5 ampere (5 A) fuse to the 12V battery 160. In this manner, the fuel tank solenoid 125 enables activation or deactivation of the recharging system 100, based on the on or off position of the switch. That is, the fuel tank solenoid 125 will automatically close when there is no 12V power and will open when the 12V power is provided. A portion of this electrical connection may be manifest by wiring through or adjacent to the vent tube 155.

The electric outlet charging box 130 (hereinafter, charging box) is a 220V box in FIG. 1, but may also be a 240V box when a 240V generator is used. The charging box 130 is a standard box for connecting electric wires and may provide a 220-240V charge through a 220-240V Level 2 charge cable 165A into a charging port 170 adapted for installation in the engine compartment 101. The charging port 170 sends the charge to the direct charge input 175, which is also adapted for installation in the engine compartment 101 and directs the charge to the electric vehicle engine in order to propel the electric vehicle.

Another 220-240V Level 2 charge cable 165B extends directly into the direct charge input 175 from the generator 105. When activated, i.e., when the electric vehicle is in motion and is fully operable, charge cable 165B provides a charge to the direct charge input 175 of the electric vehicle when the recharging system 100 is operating. In this manner, the direct charge input 175 may charge the battery powering the electric vehicle while a user is operating the electric vehicle.

That is, similar to an operation in conventional electric vehicle charging, the charge cable 165A is plugged into the charging box 130 of the electric vehicle, and the generator 105 charges the parked electric vehicle. This is effectively the equivalent of plugging in the electric vehicle cable at a charging station, as the electric vehicle must be stationary in order to receive the charge from the charging station. Otherwise, as in the case of the Bolt, the electric vehicle is designed to remain in "park" if the electric vehicle is turned on, since the charging port is connected via the electric vehicle charging cable. Electric vehicles by other manufacturers have a similar precautionary feature when electrically connected to a charging station.

However, the present invention provides a recharging system 100 that negates the requirement of a charging station. In addition, a charge cable 165B is provided as an alternative to use of the charge cable 165A, and is adapted to bypass the charging port 170 and to plug directly into the charge input 175 from the generator 105, thereby enabling the electric vehicle to be fully drivable while the recharging system 100 is being operated.

The vent hose 155 is connected to the fuel tank 115 on a first end in the passenger compartment 102 and to a fuel fill line 180 on a second end, opposite the first end, in the rear bumper area 104. The fuel fill line 180 may be an LP fill line connected to the fill valve 185, or may be a gasoline fill line when a gasoline tank is used in place of the propane tank for the fuel tank 115. The fill valve 185 exits out of the rear bumper area 104 to enable refill of the propane or gasoline into the fuel tank 115. This refill may be accomplished at any gasoline filling station when gasoline is selected to fuel the generator 105, or at an LP filling station when propane is selected to fuel the generator 105. Gasoline and LP filling stations are conveniently available to consumers and are substantially more prevalent than electric vehicle charging stations. Portions of the fuel line 140 and the fill line 180 may extend to the fuel tank 115 via the vent hose 155, as previously disclosed.

As an alternative to filling the fuel tank 115 via the fill line 180, the fuel tank 115 can be removed and replaced in order to provide a full tank of fuel for operating the generator 105.

Per ASME standards, an airtight box 190 is installed over the valves on the fuel tank 115, since the fuel tank 115 is installed in the passenger compartment 102, and the vent hose 155 is secured to the box in an airtight manner and vents any fumes to the outside of the vehicle in the event that there is a fuel leak on the valves. The airtight box 190 will be described in detail below in FIG. 4.

A heat shield 195 is installed between the passenger compartment 102 and rear compartment 103, and is a fireproof and soundproof partition with a transparent panel. A Lexan™ polymer partition may serve as the heat shield 195 in FIG. 1, but the type of partition may vary so long as the partition remains fireproof, soundproof, and transparent. Another heat shield is installed on an airduct and the exhaust system on the generator 105.

Figure 2:
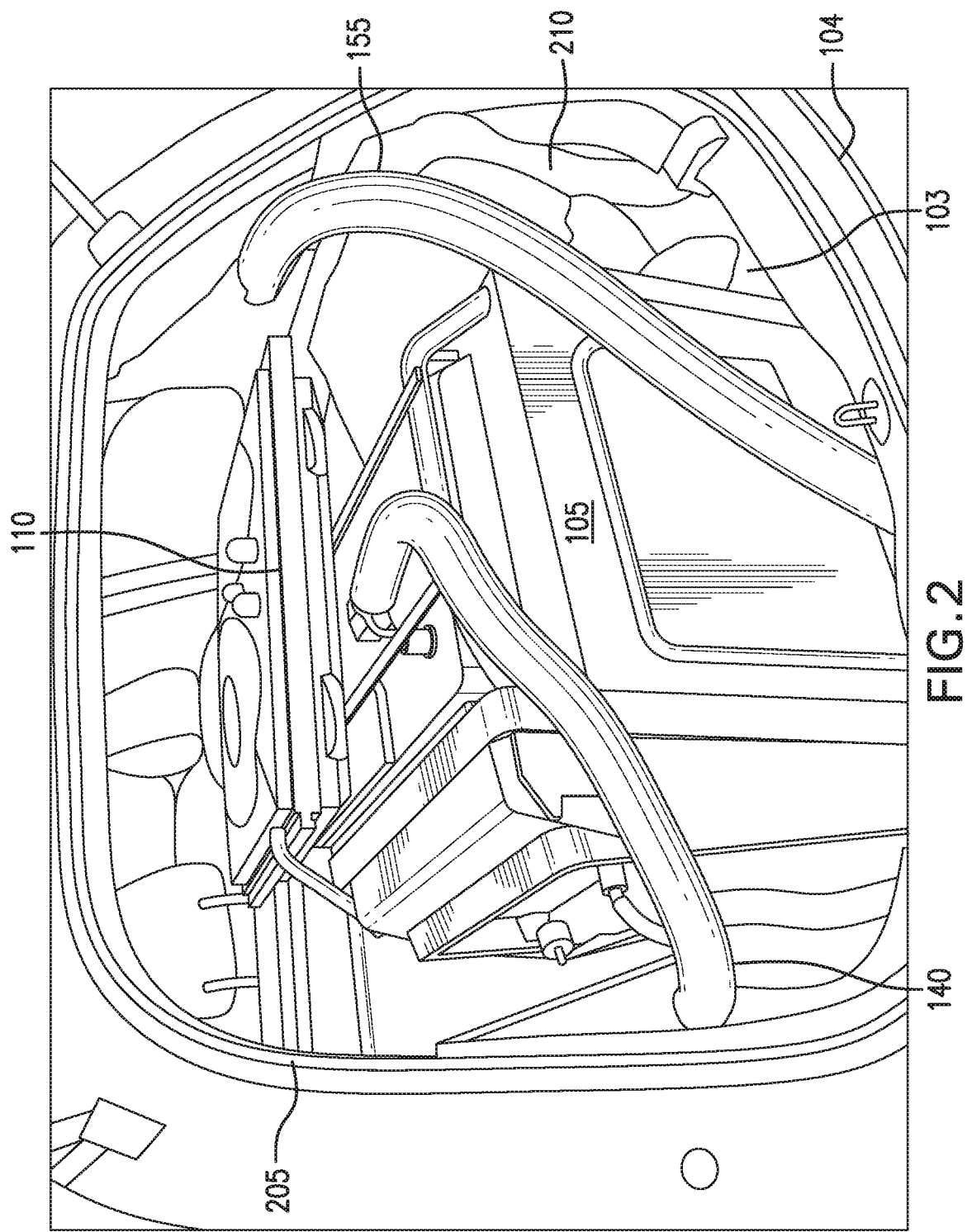
FIG. 2 illustrates a rear view of the recharging system installed in an electric vehicle according to the present invention.

FIG. 2 illustrates a rear view of the recharging system installed in an electric vehicle according to the present invention.

Referring to FIG. 2, the recharging system 100 is shown from the perspective of the open hatchback of the electric vehicle, which in the present invention may be the aforementioned Bolt. However, the electric vehicle may vary and be supplied by various manufacturers, including hatchbacks, pickup trucks, sedans, and other electric vehicle designs.

The generator 105 is located inside of the open hatchback 205, which comprises the rear compartment 103, and is partly covered above by the generator cooling apparatus 110. Protective heat shielding 210, which may be aluminum but may include other materials, is provided between the generator 105 and the electric vehicle chassis. Aft of the generator 105 and generator cooling apparatus 110 is the heat shield 195, as illustrated in FIG. 1.

The vent hose 155 extends from the fuel tank 115 alongside the lower right side of the electric vehicle, and down past the generator 105 to the rear bumper area 104, where the vent hose 155 is open for exhaust purposes, as described in reference to FIG. 1.

Figure 3:
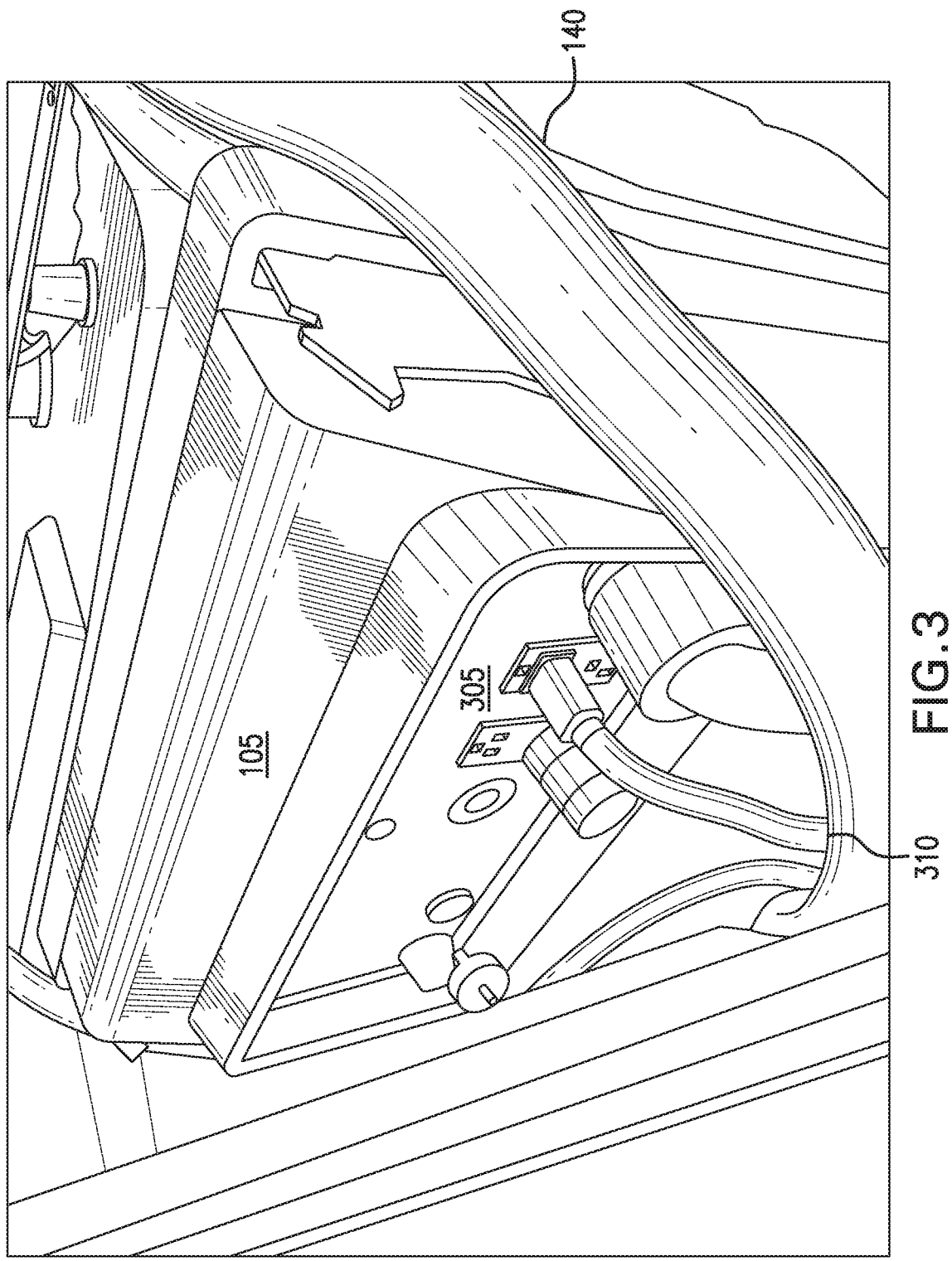
FIG. 3 illustrates a rear view of the recharging system installed in an electric vehicle according to the present invention.

FIG. 3 illustrates a side view of the generator installed in an electric vehicle according to the present invention.

Referring to FIG. 3, the left side of the generator 105 includes a 110V plug-in area 305 into which the power cord 310 is plugged on one end. The power cord 310 is wrapped in at least two layers of protective tubing and is electrically connected on the other end to the charging box 130, described in reference to FIG. 1. The plug-in area 305 is adapted to provide electrical connection to the charge cable 165B, also described in reference to FIG. 1.

Figure 4:
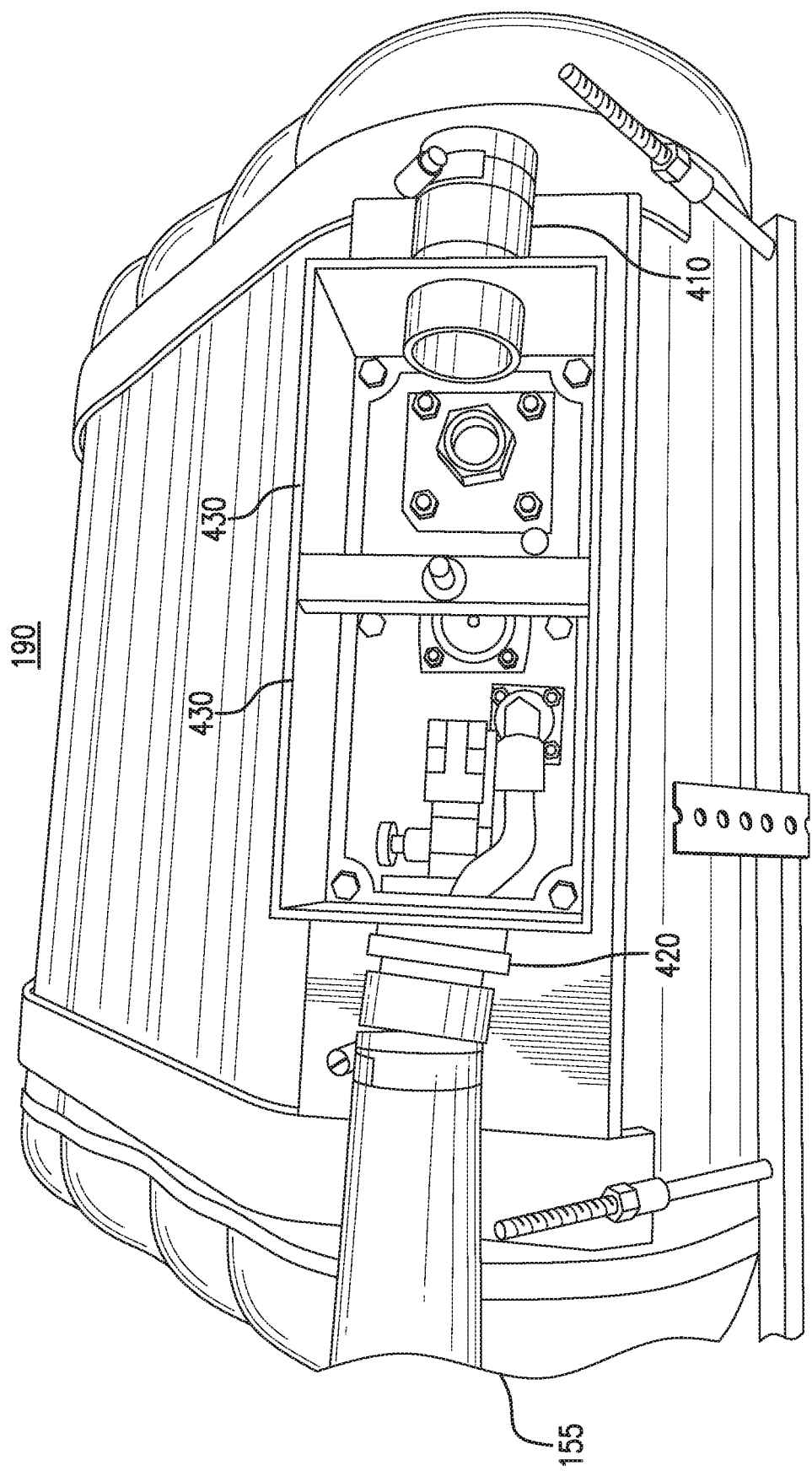
FIG. 4 illustrates the airtight box connected to a vent hose, according to the present invention.

FIG. 4 illustrates the airtight box connected to the vent hose, according to the present invention.

Referring to FIG. 4, the airtight box 190, made of aluminum or any other material satisfying ASME standards and suitable for this application, is installed adjacent to the valves of the generator fuel tank 115. A first connection 410 is provided on one side of the airtight box 190 to the valves of the fuel tank 115, and a second connection 420 is provided on the opposing side of the airtight box 190 to the vent hose 155. Between the first connection 410 and the second connection 420 is a sensor area 430 which detects and displays a reading of the amount of fuel remaining in the fuel tank 115.

The vent hose 155 is connected on the first end to the second connection 420 in an airtight manner, and is open on the second end to enable any fumes emanating from the fuel tank valves, in the event of a valve leak, to exit beneath the rear bumper area 104 of the electric vehicle, as previously described.

Figure 5:
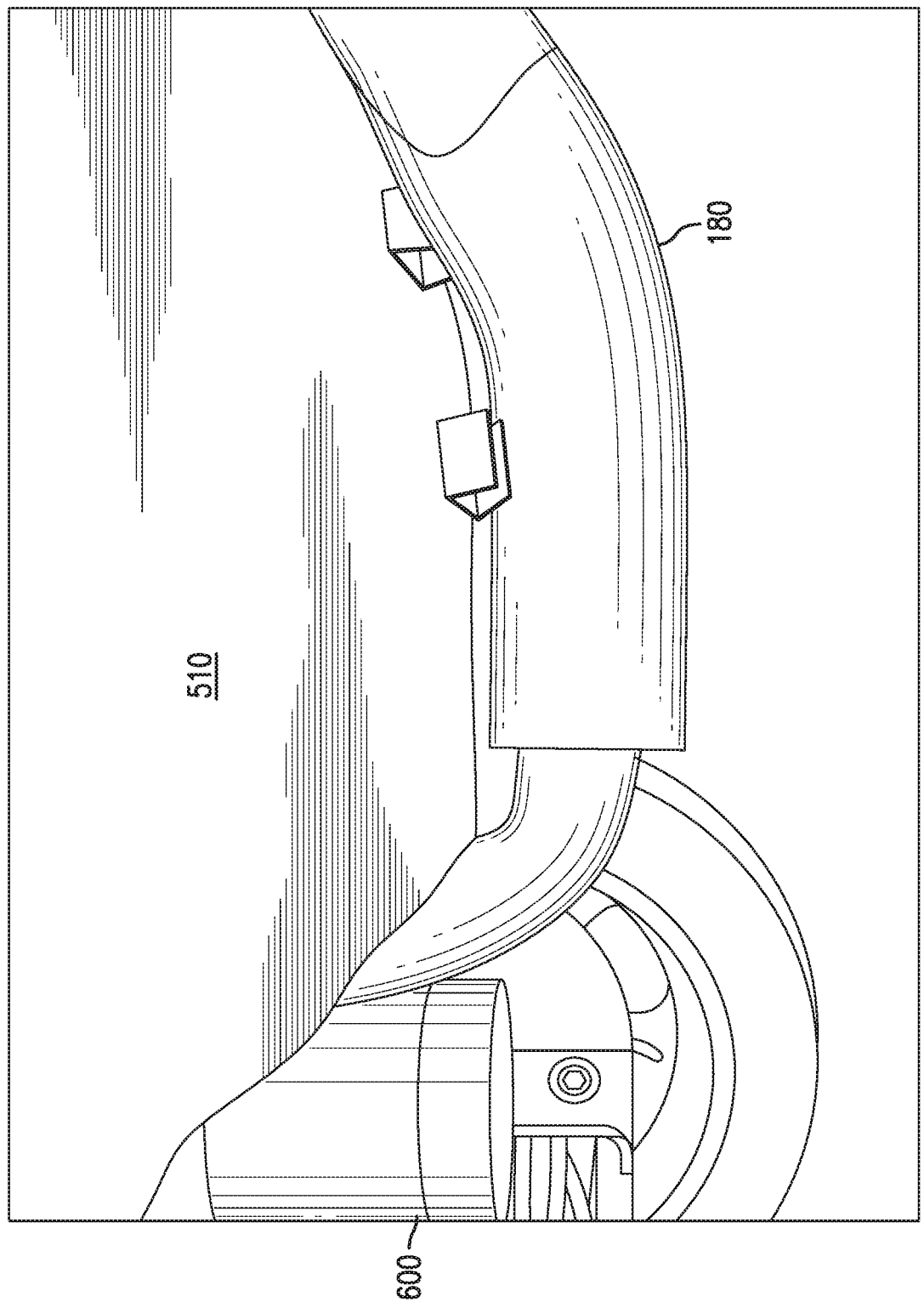
FIG. 5 illustrates the rear axle undercarriage of the electric vehicle according to the present invention.

FIG. 5 illustrates the rear axle undercarriage of the electric vehicle according to the present invention.

Referring to FIG. 5, the undercarriage 510 includes several layers of materials bonded together to form a rupture-proof, fireproof and soundproof flooring to support the components of the recharging system in the rear compartment 103.

Specifically, the undercarriage 510 constitutes a layered platform onto which the generator is mounted, and includes a first layer of sheet metal on the bottom side facing the ground, onto which a first fireproof and soundproof board is bonded, a second layer of sheet metal bonded to the first fireproof and soundproof board, a second layer of fireproof and soundproof board bonded to the second layer of sheet metal, and a third layer of sheet metal bonded to the second layer of fireproof and soundproof board on one side and having a layer of diamond-plated aluminum bonded to the opposite side. As such, the undercarriage 510 is constituted of at least five layers as described, and is between about 1-1.5 inches in thickness.

The fireproof and soundproof boards constituting the undercarriage 510 may be any of the well-known types of materials suitable for soundproof and fireproof boarding. In addition, two cross-members 610, illustrated in FIG. 6 and constructed of steel that is about 5 inches in width, extend over the entirety of the rear compartment 103 along the bottom side of the undercarriage 510, and are fastened to the electric vehicle chassis and the flooring for structural integrity, such as by bolting or another suitable manner. The generator 105 may be fastened to the flooring by bolting, as well.

The fill line 180 passes beneath the rear compartment 103 near a vent 600 which will be described in reference to FIG. 6, and is a metal ASME-certified fill line that is covered with a rubber encasement of similar material as that of a pool line, for safety purposes.

Figure 6:
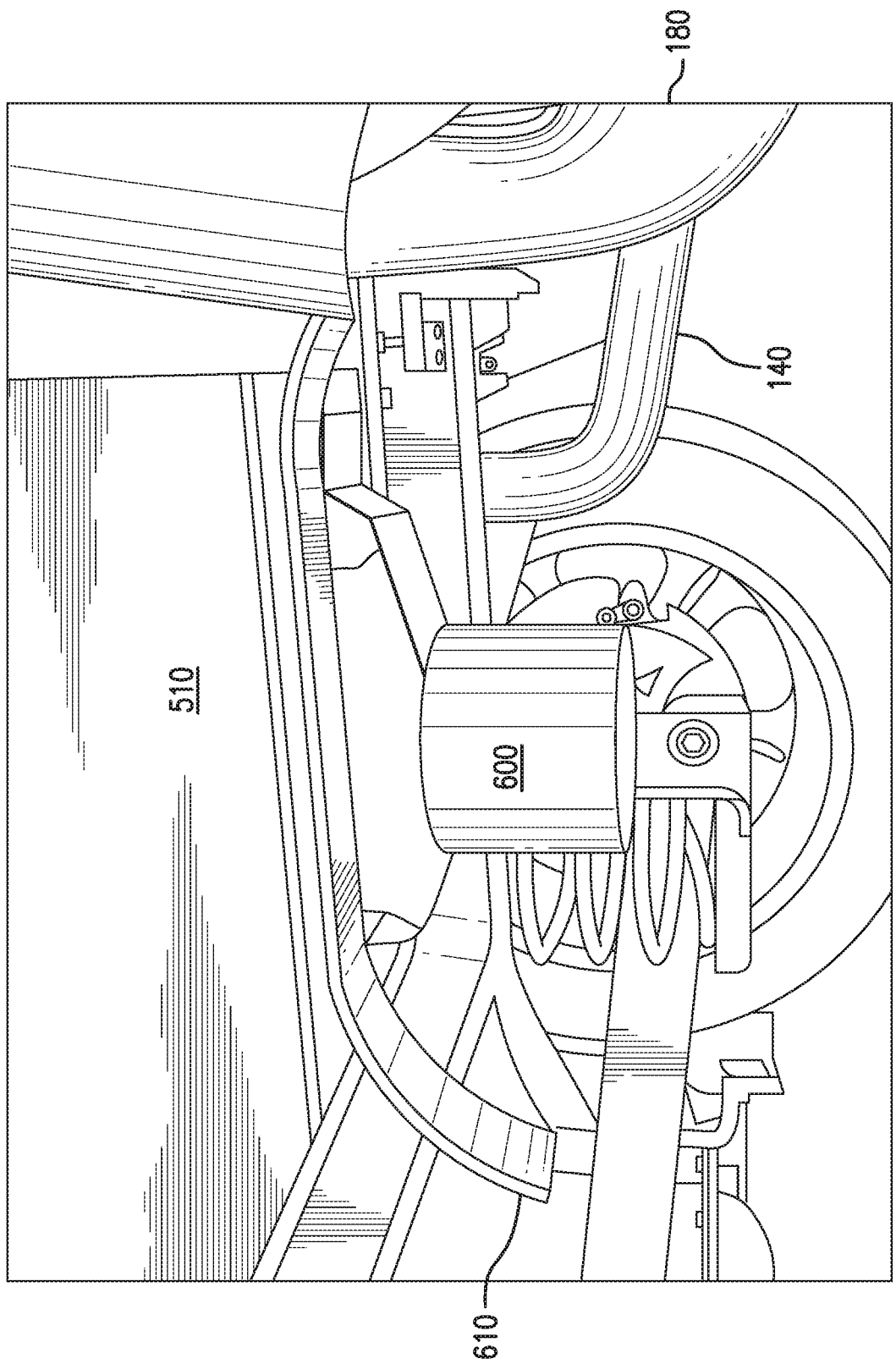
FIG. 6 illustrates a vent located in the undercarriage adjacent to the rear axle of the electric vehicle according to the present invention.

FIG. 6 illustrates the vent located in the undercarriage adjacent to the rear axle of the electric vehicle according to the present invention.

Referring to FIG. 6, the vent 600 is a round aluminum vent, but may vary in material and shape. The vent 600 is a custom vent that is connected to duct work from the generator exhaust fan, and exhausts hot air from the generator to the outside.

It is noted that in a separate exhaust system of the generator 105, the exhaust pipe 150 extends from the generator and exhausts carbon monoxide beneath the rear bumper area 104, in a manner similar to traditional gasoline vehicles.

The fuel line 140 extends past the vent 600 on the left side by a distance of at least several inches, so as not to interfere with the venting process, and similarly, the fuel line 180 is separated from the vent 600 by a sizeable distance.

Figure 7:
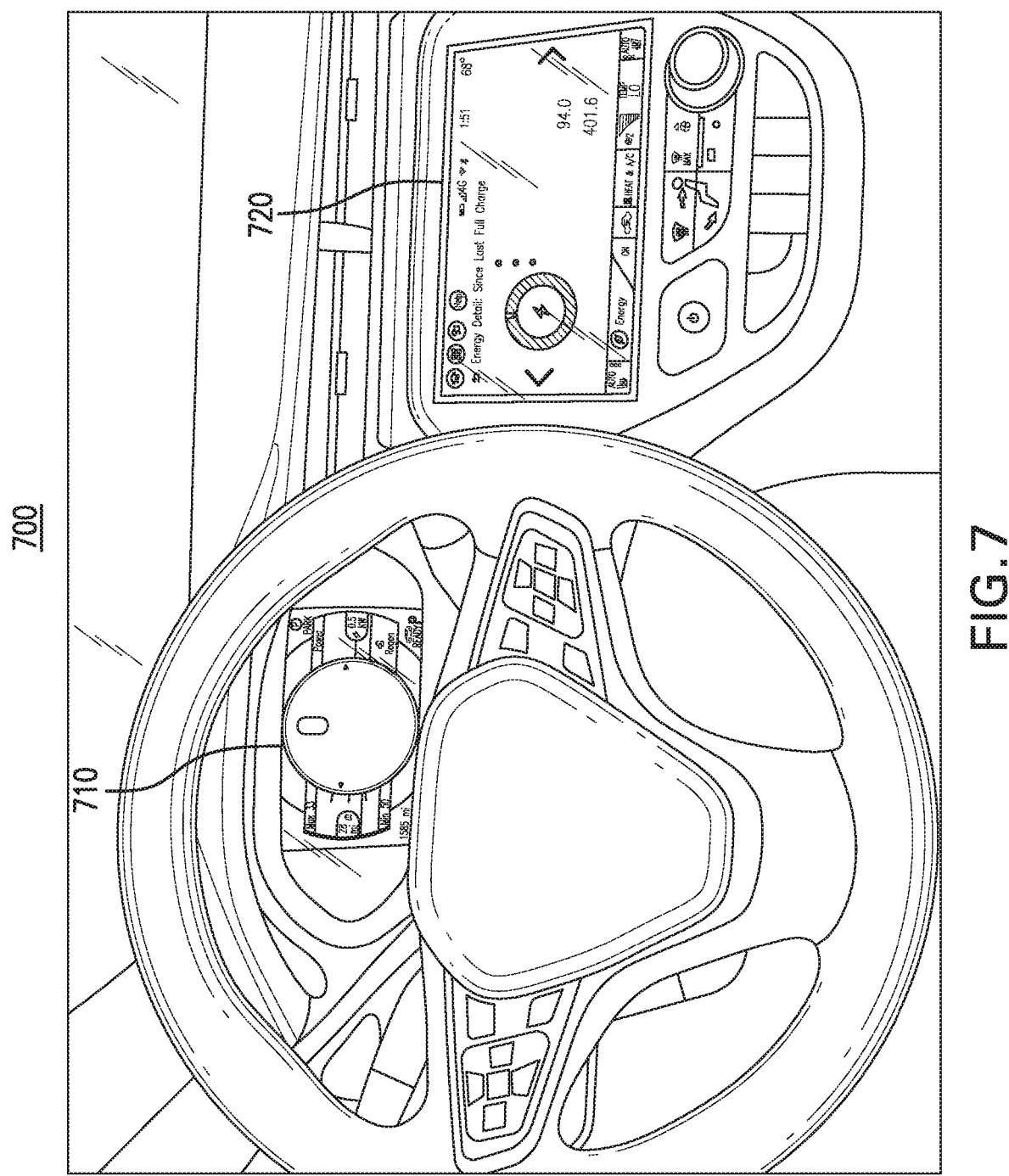
FIG. 7 illustrates a dashboard and infotainment system of the electric vehicle to which the present invention is applied.

FIG. 7 illustrates a dashboard and infotainment panel of the electric vehicle to which the present invention is applied.

Figure 8:
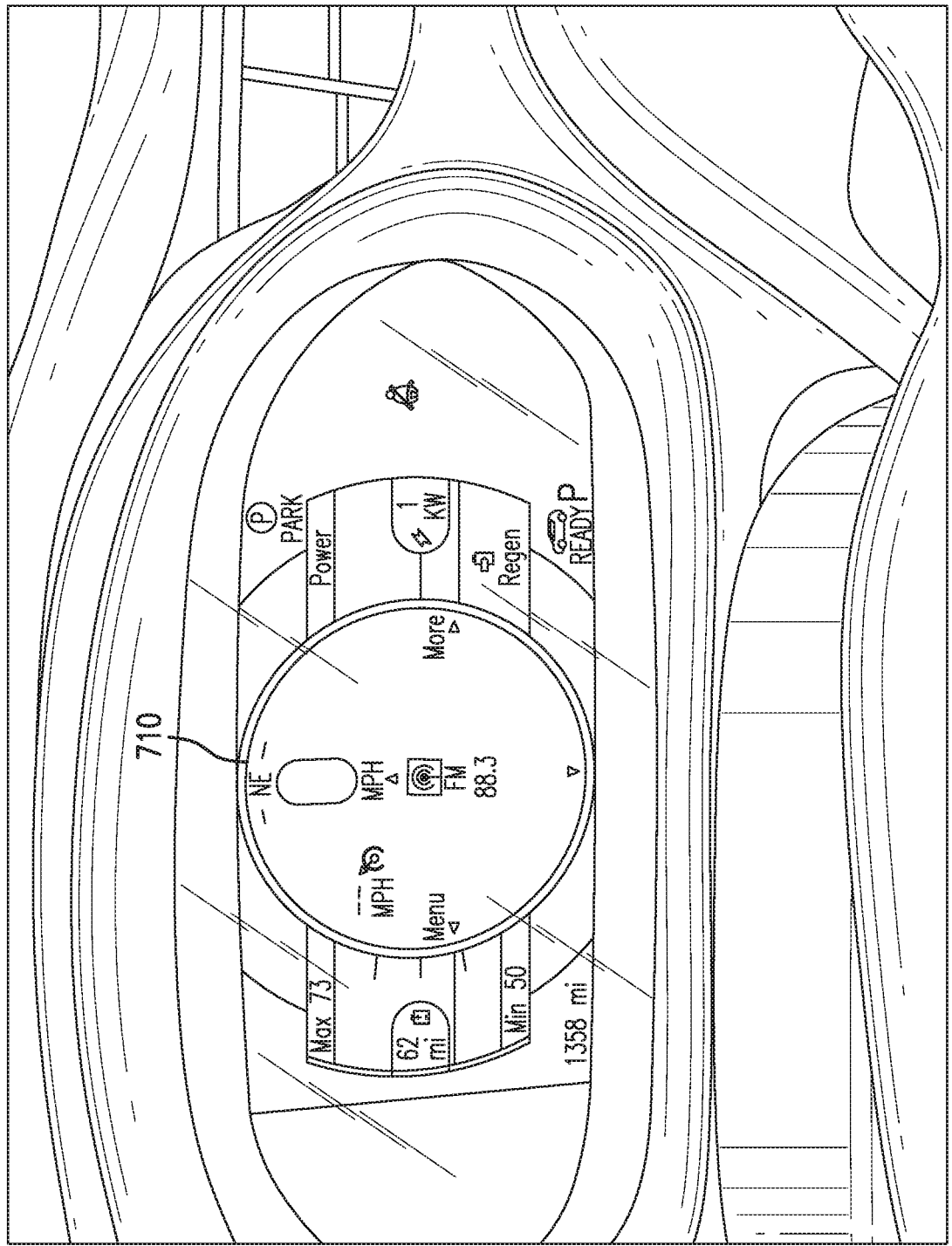
FIG. 8 illustrates a dashboard of the electric vehicle to which the present invention is applied.
Figure 9:
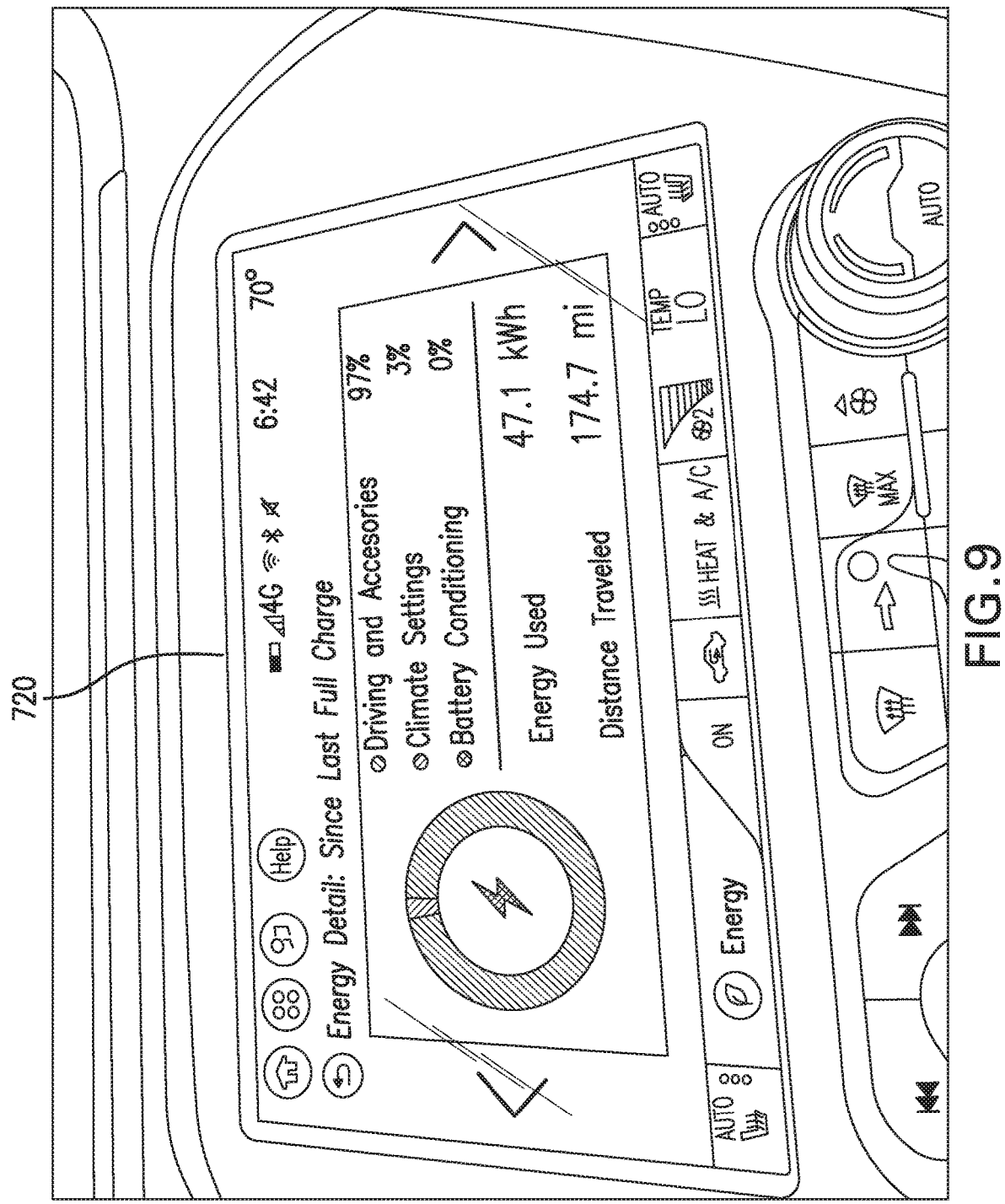
FIG. 9 illustrates an infotainment system of the electric vehicle to which the present invention is applied.

Referring to FIG. 7, the dashboard and infotainment panel 700 includes a dashboard 710 which displays vehicle information, such as vehicle speed, in the conventional manner and electric vehicle information, particularly described in FIG. 8, and an infotainment system 720 which displays information related to the status of the electric vehicle, particularly described in FIG. 9, among a wealth of additional information.

In the present invention, the dashboard and infotainment panel 700 enables the user to visualize the efficiency and charge gains that the recharging system 100 may achieve over the electric vehicle recharging in the conventional art.

FIG. 8 illustrates the dashboard 710 of the dashboard and infotainment panel 700 to which the present invention is applied.

In FIG. 8, the dashboard 710 may display conventionally-displayed driver information including driver restraint status, and vehicle information including vehicle speed, gear selection, and maintenance status.

In addition, the dashboard 710 may display information that is displayed, in more detail, on the infotainment system 720, such as audio, navigation, and electric vehicle charge status information.

FIG. 9 illustrates the infotainment system 720 of the dashboard and infotainment panel 700 to which the present invention is applied.

In FIG. 9, the infotainment system 720 may display information related to controls that can be handled via touch, voice, steering-wheel-mounted controls, buttons, and a volume knob, and in relation to the present invention, may display an energy detail panel, such as in a pie chart. The infotainment system 720 depicts the amount of battery energy deployed for driving, climate control, and battery conditioning and energy usage since the last full charge.

In addition, the infotainment system 720 may display a menu that gives charging options, provides battery-charge status, and offers the driver a variety of energy settings. For example, when the Bolt is switched off, a pop-up message identifies how many miles have been driven since the last full charge, the amount of energy used, and a prediction of how many miles of range remain.

In a prototype of the recharging system 100 according to the present invention, installed in a Bolt with the propane fuel option, the infotainment system 720 displayed a distance traveled of 888 miles from four onboard generator charges achieved by one-and-a-half tanks of propane fuel and utilizing the charging cord 165A. As previously noted, the Bolt is estimated to achieve a distance traveled of 238 miles on one charge at the charging station. The recharging system 100 of the present invention has achieved over three times the distance traveled between refilling of the generator fuel tank 115. Thus, the recharging system 100 substantially increases the mileage range and flexibility of the battery recharge of the electric vehicle.

In another embodiment, the recharging system of the present invention can be used to charge 110V or 220V-240V consumer products, such as power tools, when not being used to charge the battery of the electric vehicle, or as an emergency power source during power grid outages.

Embodiments of the present invention disclosed in the specification and the drawings are only particular examples disclosed in order to easily describe the technical matters of the present invention and assist with comprehension of the present invention, and do not limit the scope of the present invention. Therefore, in addition to the embodiments disclosed herein, the scope of the embodiments of the present invention should be construed to include all modifications or modified forms drawn based on the technical aspects of the embodiments of the present invention.

While the present invention has been described with reference to various embodiments, various changes may be made without departing from the spirit and the scope of the present invention, which is defined, not by the detailed description and embodiments, but by the appended claims and their equivalents.

What is claimed is:

1. An onboard recharging system for an electric vehicle, comprising:
    a generator configured to be installed in the electric vehicle;
    a fuel tank configured to supply fuel to the generator;
    a fuel detector positioned adjacent to the fuel tank and configured to detect fuel leakage from the fuel tank and carbon monoxide in the electric vehicle;
    a charging port configured to receive a charge from the generator;
    a first charging cable configured to electrically connect to the generator and a charge input; and
    the charge input configured to receive the charge from the charging port when the first charge cable is disconnected from the charge input, receive the charge directly from the generator when the first charge cable is connected to the charge input, and supply the charge to a battery, in an amount that enables an electric engine of the electric vehicle to operate,
    wherein the charge is supplied to the battery while the electric vehicle is not being operated when the first charge cable is disconnected from the charge input, and is supplied to the battery while the electric vehicle is being operated when the first charge cable is connected to the charge input, and
    wherein the generator is a 7000 Watts pure sine wave grid equivalent power generator.

2. The recharging system of claim 1,
    wherein the charge is 220 volts or 240 volts.

3. The recharging system of claim 2, wherein the generator is a liquid propane powered generator or a gasoline powered generator.

4. The recharging system of claim 3,
    wherein the fuel is liquid propane when the generator is a propane powered generator, and
    wherein the fuel is gasoline when the generator is a gasoline powered generator.

5. The recharging system of claim 4,
    wherein the fuel detector is further configured to detect a liquid propane or gasoline leak from the fuel tank, inside the electric vehicle.

6. The recharging system claim 1, further comprising:
    a cooling apparatus positioned adjacent to the generator and configured to receive power from the generator and to direct a cooling fluid to the generator when the generator is operating.

7. The recharging system of claim 5, further comprising:
    a charging box electrically connected to the generator; and
    a second charge cable configured to electrically connect to the charging box and the charging port and to supply the charge to the charging port, when the first charge cable is disconnected from the charge input.

8. A method of recharging a battery powering an electric engine in an electric vehicle, comprising:
    activating and supplying fuel to a generator that is installed in the electric vehicle;
    receiving a charge from the generator through a charge input; and
    supplying the charge to the battery, in an amount that enables the electric engine to operate,
    wherein a fuel detector is positioned adjacent to the fuel tank and is configured to detect fuel leakage from the fuel tank and carbon monoxide in the electric vehicle, and
    wherein the charge is supplied to the battery while the electric vehicle is not being operated when a first charge cable is disconnected from the charge input, and is supplied to the battery while the electric vehicle is being operated when the first charge cable is connected to the charge input, and
    wherein the generator is a 7000 Watts pure sine wave grid equivalent power generator.

9. The method of claim 8,
    wherein the charge is 220 volts or 240 volts.

10. The method of claim 9, wherein the generator is a liquid propane powered generator or a gasoline powered generator.

11. The method of claim 10,
    wherein the fuel is supplied to the generator from a fuel tank positioned inside or outside of the electric vehicle.

12. The method of claim 11,
    wherein the fuel is liquid propane when the generator is a propane powered generator, and
    wherein the fuel is gasoline when the generator is a gasoline powered generator.

13. The method of claim 12,
    wherein the fuel detector is further configured to detect a liquid propane or gasoline leak from the fuel tank, inside the electric vehicle.

14. The method of claim 8, further comprising:
    positioning a cooling apparatus adjacent to the generator; and
    directing a cooling fluid to the generator, by the cooling apparatus, when the generator is operated.

15. The method of claim 11,
    wherein, when the first charge cable is disconnected from the charge input, the charge is received from the generator by a charging box that is electrically connected to the generator, and
    wherein the charge is supplied to the battery by a second charge cable electrically connected between the charging box and the charging port.

* * * * *